United States Patent

Kozasa et al.

[11] Patent Number: 5,805,343
[45] Date of Patent: Sep. 8, 1998

[54] OPTICAL ELEMENT AND A METHOD FOR FORMING THE SAME

[75] Inventors: Naoto Kozasa; Takahiro Kobayashi; Kenji Suzuki; Jiro Fujimori, all of Yamanashi, Japan

[73] Assignees: Pioneer Electronic Corporation, Tokyo; Pioneer Video Corporation, Yamanashi, both of Japan

[21] Appl. No.: 755,821

[22] Filed: Nov. 26, 1996

[30] Foreign Application Priority Data

Dec. 1, 1995 [JP] Japan .................................. 7-338061

[51] Int. Cl.[6] .................................................. G02B 27/10
[52] U.S. Cl. ............................................. 359/620; 359/743
[58] Field of Search ..................... 359/740, 742, 359/743, 620

[56] References Cited

U.S. PATENT DOCUMENTS 4,855,170  8/1989  Darvell et al. ............................ 428/40
5,361,616  11/1994  Takahashi et al. ........................ 72/46

Primary Examiner—David C. Nelms
Assistant Examiner—Thomas Robbins
Attorney, Agent, or Firm—Morgan, Lewis & Bockius LLP

[57] ABSTRACT

An optical element includes a light-transmittable substrate and a light-transmittable dry-light-curing-film layered on the substrate and having an undulant pattern on a surface thereof, characterized by the dry-light-curing-film has a specific range viscosity at room temperature in the unhardened state, a specific range thickness in the unhardened state, the specific range creep and creep recovery characteristics.

A method of making an optical element includes steps of: providing a molding die having an undulant pattern on a surface thereof; providing a dry-light-curing-film has a specific range viscosity at room temperature in the unhardened state, a specific range thickness in the unhardened state, the specific range creep and creep recovery characteristics; pressing the film onto the surface of the molding die by a roller under heated and reduced pressure conditions to form undulant pattern on the film; affixing a light-transmittable substrate to the film while pressing the substrate by a roller under an increased pressure condition to form a laminate; irradiating an UV radiation into the film to harden the film; and separating the molding die from the film to form an optical element.

2 Claims, 3 Drawing Sheets

OPTICAL ELEMENT AND A METHOD FOR FORMING THE SAME

BACKGROUND OF THE INVENTION

1. Field of the Invention

The present invention relates to an optical element such a projection screen or an optical filter such as a black matrix used for a projection TV, and in particular to a method for forming the same.

2. Description of the Related Art

To make a good image on the projection screen of the projection TV, a microfilm reader or the like, the screen may be formed from an optical element such as a lenticular lens, a Fresnel lens or the like. In usual, such an optical element may be made of a transparent resin such as acrylic resins, polycarbonate resins, polyvinyl chloride resins, styrene resins or the like. There is known that the optical element may be formed through an injection molding method in which the resins is injected into a cavity of a predetermined lens-molding die and, alternatively, a press molding method in which a flat plate of resin is abutted and pressed onto the lens-molding die under a heated state to transfer-mold the lens pattern onto the resin plate.

In the injection molding method, however, it is difficult to form a large size optical element but only a relatively small optical element. The press molding method is problematic in that, since it requires a long time period for performing one heating and cooling cycle for the resin plate and the lens-molding die, a large number of the lens-molding dies are required in a batch for a mass production of the optical elements and, so that the equipment for manufacturing the large optical element is costly hugely.

On the other hand, another molding method has been proposed that a radiation curing resin curable by irradiation of activation energy is poured into the lens-molding die and, then, exposed under the activation radiation to harden the resin. In this molding method using the activation energy radiation curing resin, however, it is very difficult to pour the fluid radiation curing resin into the lens-molding die without involving bubbles although shortening the molding period and improving the productivity. To dissolve this problem, it is required to perform a treatment to remove the bubbles from the resin in the lens-molding die. Alternatively, it will be necessary to more slowly pour the fluid radiation curing resin into the lens-molding die. This molding method is not fast enough in rate to meet the needs of mass production technology. Particularly, the lens-molding die has an undulant pattern consisting of grooves or recesses in which bubbles occur easily and tend to stay when being filled with the fluid radiation curing resin into. The main problem associated with the casting of the fluid radiation curing resin is that the occurrence of bubble brings a defective lens.

SUMMARY OF THE INVENTION

It is, therefore, an object of the invention to provide an optical element capable of being molded in such a manner that an undulant pattern of a lens-molding die is precisely transferred thereto to produce non-defective element, and to provide a method for forming the same.

The object may be achieved by using an optical element according to the invention comprising;

a light-transmittable substrate;

a light-transmittable dry-light-curing-film layered on the light-transmittable substrate and having an undulant pattern on a surface thereof; and said dry-light-curing-film characterized by the following;

(a) a viscosity ranging from 3,500 to 400,000 poises at room temperature in the unhardened state, (b) a thickness ranging from 30 to 100 micrometers in the unhardened state, (c) a creep characteristic and a creep recovery characteristic being satisfied with the following inequalities (1) and (2) respectively, $$0.4 =< \text{delta-}x/x \quad (1)$$

$$0.4 => \text{delta-}x''/\text{delta-}x' \quad (2)$$

wherein x denotes a thickness of the dry-light-curing-film, delta-x denotes a saturated strain developed in the thickness direction of the dry-light-curing-film disposed between a pair of circular plates to which a pressure of 50,000 dyne/cm$^2$ at 80 centigrade degree, delta-x' denotes a strain developed in the periphery of one of a pair of circular plates between which the dry-light-curing-film is disposed and adhering them when the one of circular plates is twisted with a force of 5000 dyne at 80 centigrade degree with respect to the other, and delta-x" denotes a saturated back strain developed in the periphery of the one of circular plates after release of the force of 5000 dyne.

In another aspect of the invention, a method of making an optical element comprises the steps of:

providing a molding die having an undulant pattern on a surface thereof;

providing a dry-light-curing-film characterized by the following;

(a) a viscosity ranging from 3,500 to 400,000 poises at room temperature in the unhardened state, (b) a thickness ranging from 30 to 100 micrometers in the unhardened state, (c) a creep characteristic and a creep recovery characteristic being satisfied with the following inequalities (1) and (2) respectively, $$0.4 =< \text{delta-}x/x \quad (1)$$

$$0.4 => \text{delta-}x''/\text{delta-}x' \quad (2)$$

wherein x denotes a thickness of the dry-light-curing-film, delta-x denotes a saturated strain developed in the thickness direction of the dry-light-curing-film disposed between a pair of circular plates to which a pressure of 50,000 dyne/cm$^2$ at 80 centigrade degree, delta-x' denotes a strain developed in the periphery of one of a pair of circular plates between which the dry-light-curing-film is disposed and adhering them when the one of circular plates is twisted with a force of 5000 dyne at 80 centigrade degree with respect to the other, and delta-x" denotes a saturated back strain developed in the periphery of the one of circular plates after release of the force of 5000 dyne;

pressing the dry-light-curing-film onto the surface of the molding die by a roller under heated and reduced pressure conditions to form undulant pattern on the dry-light-curing-film;

affixing a light-transmittable substrate to the dry-light-curing-film while pressing the substrate by a roller under an increased pressure condition to form a laminate;

irradiating an UV radiation into the dry-light-curing-film to harden the dry-light-curing-film; and separating the molding die from the dry-light-curing-film to form an optical element.

By using the dry-light-curing-film the specific thickness and the specific viscosity, the invention achieves an accurate transfer-molding of the undulant pattern for making the optical element without remaining any bubbles through simple equipments in a short period.

The above set forth and other features of the invention will be made more apparent in the ensuing Detailed Description of the Invention when read in conjunction with the attached Drawings.

DESCRIPTION OF THE PREFERRED EMBODIMENT

The preferred embodiments according to the present invention will be described in detail below with reference to the accompanying drawings.

Figure 1:
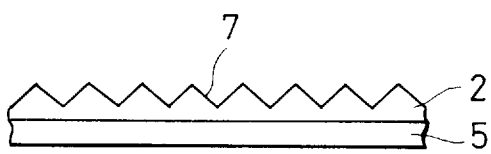
FIG. 1 is a sectional view showing a Fresnel lens according to the invention.

FIG. 1 shows a Fresnel lens of the optical element according to the invention in which this optical element comprises a light-transmittable substrate 5 and a dry-light-curing-film 2 as a laminate. The dry-light-curing-film 2 has a lens pattern 7 on the surface thereof.

Materials used for the light-transmittable substrate 5 are transmittable substances in at least visible spectrum band, for example, synthetic resins such as polycarbonate (PC), poly methyl methacrylate (PMMA) or the like resin, or inorganic materials such as an optical glass.

The light-transmittable substrate 5 of a synthetic resin may be formed as a predetermined shape through the shaping methods such as protrusion molding or injection molding. In addition to such molded resin substrate, a punching with the predetermined shape die-cut from a resin sheet may be used for the substrate.

The shape and dimensions of the light-transmittable substrate 5 are predetermined in accordance with the use of the optical element.

The dry-light-curing-film 2 laminated on the flat light-transmittable substrate 5 may carry the lens pattern 7 as an undulant pattern e.g., lenticular lens or Fresnel lens pattern.

The dry-light-curing-film 2 has a viscosity of 3,500 to 400,000 poises, preferably 20,000 to 40,000 poises at room temperature in the unhardened state and has a nature of curing or hardening under the irradiation of an UV radiation. The dry-light-curing-film 2 does not contain a solvent inherently.

When the dry-light-curing-film 2 has a viscosity less than 3,500 poises at room temperature in the unhardened state, it is a substantially fluid so that the film form is no longer retained and further the excessive contraction occurs during the curing of the film. On the other hand, when such a viscosity of the film exceeds 400,000 poises, the pressure required for pressing the film onto the lens pattern of the die is tens tons, so that the light-transmittable substrate 5 may undergo some deterioration of mechanical characteristics. In such a high viscosity film, bubbles apt to remain during the manufacture and its adherence to the light-transmittable substrate 5 decreases unpractically.

The dry-light-curing-film 2 has a thickness of 30 to 100 micrometers, preferably 50 to 75 micrometers in the unhardened state. When the dry-light-curing-film 2 has a thickness less than 30 micrometers, inconvenience occurs in the transfer-molding of the lens pattern 7. When the dry-light-curing-film 2 has a thickness exceeding 100 micrometers, wrinkles of the dry-light-curing-film 2 easily occur during the storage in the unhardened state. Furthermore, the internal stress may be excessive due to the contraction during the curing.

The dry-light-curing-film 2 is made of a light-curing resin composition which changes monomer or oligomers into a high molecular weight polymer through the cross-linking and/or polymerization by initiated by light, e.g., a photo-polymerization type photosensitive resin composition.

This photo-polymerization type photosensitive resin composition includes an ethylene unsaturated monomer, a photo-polymerization initiator and a binder-polymer.

The ethylene unsaturated monomer is selected form a group of, for example, t-buthylacrylate, 1,5-pentanedioldiacrylate, N,N-diethylaminoethylacrylate, ethylene glycoldiacrylate, 1,4-butanedioldiacrylate, diethylene glycoldiacrylate, 1,3-propanedioldiacrylate, decamethylene glycoldiacrylate, decamethylene glycoldimethacrylate, 1,4-cyclohexenedioldiacrylate, 2,2-dimethylolpropanediacrylate, glyceroltriacrylate, tripropylene glycoldiacrylate, glyceroltriacrylate, trimethylolpropanetriacrylate, pentaerythritoltriacrylate, polyoxyethylationed-trimethylolpropanetriacrylate, polyoxyethylationed-trimethylolpropanetrimethacrylate, 2,2-di (p-hydroxyphenyl) -propanediacrylate, 2,2-di (p-hydroxyphenyl) -propanedimethacrylate, pentaerythritoltetraacrylate, triethylene glycoldiacrylate, polyoxyethyl-2,2-di (p-hydroxyphenyl) propanedimethacrylate, triethylene glycoldimethacrylate, polyoxypropyltrimethylolpropanetriacrylate, ethylene glycoldimethacrylate, buthylene glycoldimethacrylate, 1,3-propanedioldimethacrylate, 1,2,4-butanetrioltrimethacrylate, 2,2,4-trimethyl-1,3-pentanedioldimethacrylate, pentaerythritoltetramethacrylate, trimethylolpropanetrimethacrylate, and 1,5-pentanedioldimethacrylate.

For example, one or more of these ethylene unsaturated monomers may be included in the dry-light-curing-film 2.

The ethylene unsaturated monomer provides 5 to 90 wt. %, preferably 15 to 50 wt. % of the photo-polymerization type photosensitive resin composition.

The photo-polymerization initiator is selected form a group of, for example, polynuclear quinones such as 9,10-anthraquinone, 1-chloroanthraquinone, 2-chloroanthraquinone, 2-methylanthraquinone, 2-ethylanthraquinone, 2-t-buthylanthraquinone, octamethylanthraquinone, 1,4-naphthoquinone, 9,10-phenanthrequinone, 1,2-benzanthraquinone, 2,3-benzanthraquinone, 2-methyl-1,4-naphthoquinone, 2,3-benzanthraquinone, 2-methyl-1,4-naphthoquinone, 2,3-dichloronaphthoquinone, 1,4-dimethylanthraquinone, 2,3-dichloronaphthoquinone, 1,4-dimethylanthraquinone, 2,3-dichloronaphthoquinone, 1,4-dimethylanthraquinone, 2,3-dimethylanthraquinone, 2,3-diphenylanthraquinone, 2-phenylanthraquinone, anthraquinone-α-sodium sulfonate, 3-chloro-2-methylanthraquinone, retenequinone, 7,8,9,10-tetrahydronaphthacenequinone, and further compounds such as benzoin, pivaloin, acyloin ether, α-hydrocarbon-substituted aromatic acyloin, phenazine, oxazine, Michler's ketone, benzophenone, and cyclohexadiene. For example, these photo-polymerization initiators may be used preferably together with a sensitizer.

For example, these photo-polymerization initiators may be used in a single kind or the combination of more kinds.

The photo-polymerization initiator provides 0.5 to 30 wt. %, preferably 1 to 5 wt. % of the photo-polymerization type photosensitive resin composition.

The binder-polymer is selected form a group of, for example, poly methyl methacrylate, polyethylmethacrylate, polyvinyl acetate, polyvinyl acetate/acrylate, polyvinyl acetate/methacrylate, ethylene/vinylacetate copolymer, polystyrene polymer and copolymer, vinylidene chloride/acrylonitrile, a copolymer consising of vinylidene chloride/methacrylate and vinylidene chloride/vinylideneacetate, polyvinyl chloride and the copolymer thereof, butadiene/acrylonitrile, acrylonitrile/butadiene/styrene, methacrylate/acrylonitrile/butadiene/styrene copolymer, 2-chlorobutadiene-1,3-polymer, chlorinaiton rubber, styrene/butadiene/styrene, styrene/isoperne/styrene block copolymer, an epoxide containing acrylate group or methacrylate group, copolyester, polyamide, cellulose ester, cellulose ether, polycarbonate, polyvinyl acetal, and polyformaldehyde.

For example, these binder-polymers may be used in a single kind or the combination of more kinds.

The binder-polymer provides 5 to 90 wt. % of the photo-polymerization type photosensitive resin composition.

For example, the photo-polymerization type photosensitive resin composition may further contain various components such as plasticizer, tackifier, UV radiation absorbent, oxidation inhibitor, fluorescent whitening agent, thermal stabilizer, mold releasing agent and the like, other than the foregoing components, so far as the dry-light-curing-film 2 at room temperature in the unhardened state has the foregoing viscosity range.

The plasticizer may provide 0 to 25 wt. %, preferably 5 to 15 wt. % of the photo-polymerization type photosensitive resin composition. The other components may provide 0 to 5 wt. %, preferably 1 to 4 wt. % of the resin composition.

Moreover, in addition to the photo-polymerization type photosensitive resin composition above mentioned, a light double-chain structure type photosensitive resin composition or a light cross-linked structure type photosensitive resin composition may be used for the dry-light-curing-film 2.

The dry-light-curing-film 2 in the unhardened state receives the lens pattern 7 from the forming die. The dry-light-curing-film 2 is layered on the light-transmittable substrate 5 and hardened by UV radiation. The dry-light-curing-film 2 and the light-transmittable substrate 5 adhere to each other using tacky adhesion of the dry-light-curing-film. It is therefore unnecessary to provide any adhesive layer between the dry-light-curing-film 2 and the light-transmittable substrate 5 in this Fresnel lens.

Further, the dry-light-curing-film 2 after hardened by light has a refraction index of 1.40 to 1.60 in such a manner that the difference in refraction index from that of the light-transmittable substrate 5 is 0.05 or less.

The height range of the lens pattern 7 formed in the dry-light-curing-film 2 is from 100 to 150 micrometers in the Fresnel lens used for the projection TV.

The dry-light-curing-film is deformed while passing between a pair of pressing rolls so as to be pressed and spread deeply into grooves of the Fresnel lens pattern undulation. It is desired to make the dry-light-curing-film as thin as possible in order to reduce the cost of materials. Ideally, the thickness of the film is desirably set to a half of average height of the Fresnel lens pattern. For example, since the Fresnel lens for the ordinary projection TV have an average height of approximately 100 to 150 micrometers, the dry-light-curing-film necessitates at least a thickness of 50 to 75 micrometers. In general, the dry-light-curing-film with a thickness exceeding 100 micrometers is problematic in its storage. Therefore, it is necessary to make the dry-light-curing-film thin for the transfer-molding. In other words, the desired characteristics of the dry-light-curing-film are the readily deformation caused by the roll pressing and the large strain at that time.

The other desired characteristics of the dry-light-curing-film is that the particular deformation is retained, without the restoration of shape, until it hardens with an UV radiation after release of the pressing force due to the passing of the light-transmittable substrate and the film between the rolls.

Both these necessary characteristics are the creep characteristic and the creep recovery characteristic.

The remarkable deformation of the film caused by the application of pressure in the laminating process is a creep deformation involving the change of internal structure due to the rearrangement of molecular chains. This change of internal structure reduces the internal stress to make the degree of the restoration after release of the pressing lower than that of the deformation by the pressing. Since the force of the restoration is smaller than the tackiness between the stamper and the dry-light-curing-film, the deformed film is retained without peeling thereof.

The characteristics of transfer-molding, creep and a creep recovery has been measured on three kinds of dry-light-curing-films A, B and C of Fresnel lens patterns respectively, at lamination temperatures 25 centigrade degree, 40 centigrade degree, 60 centigrade degree, and 80 centigrade degree. Such evaluations of the results are shown in the following Table 1.

The dry-light-curing-film C exhibits good transfer-molding characteristic at 80 centigrade degree. The dry-light-curing-film B exhibits good transfer-molding characteristic at 60 centigrade degree and 80 centigrade degree respectively. The samples exhibiting bad transfer-molding characteristic are not enough to be filled and spread with the dry-light-curing-film into the bottoms of grooves in the Fresnel pattern forming dies.

Figure 3:
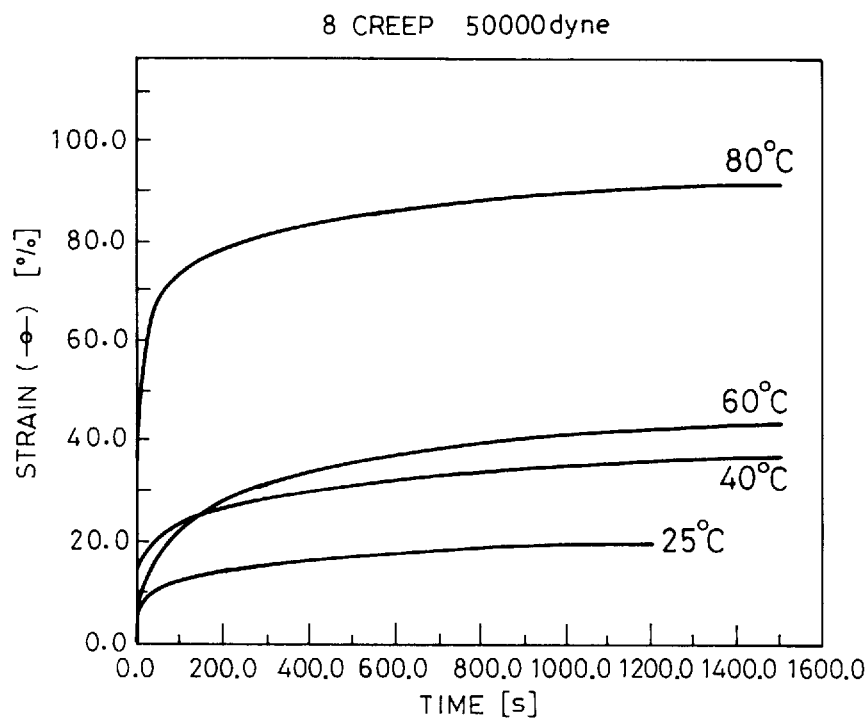
FIGS. 3 and 4 are graphs of creep characteristics in embodiments according to the invention.
Figure 4:
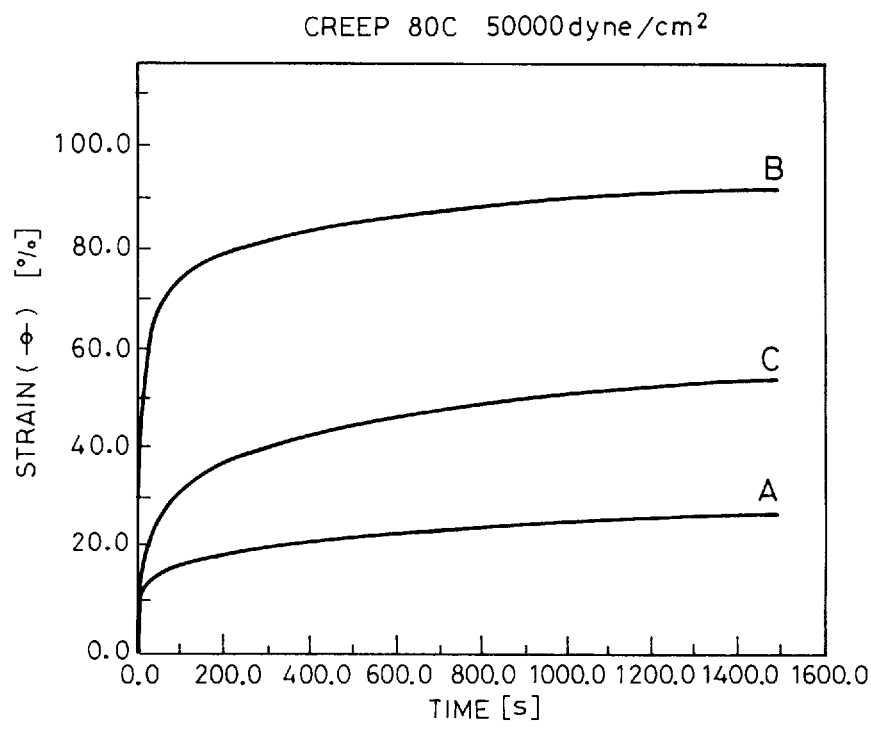

FIG. 3 shows curves of creep characteristics of the dry-light-curing-film B at temperatures of 25 centigrade degree, 40 centigrade degree, 60 centigrade degree, and 80 centigrade degree. FIG. 4 shows curves of creep characteristics of the three kinds of the dry-light-curing-films A, B and C at 80 centigrade degree respectively. The saturated strains of regularity creep in FIGS. 3 and 4 are read as creep characteristics. Such evaluations of the results are shown in the following Table 1.

Figure 5:
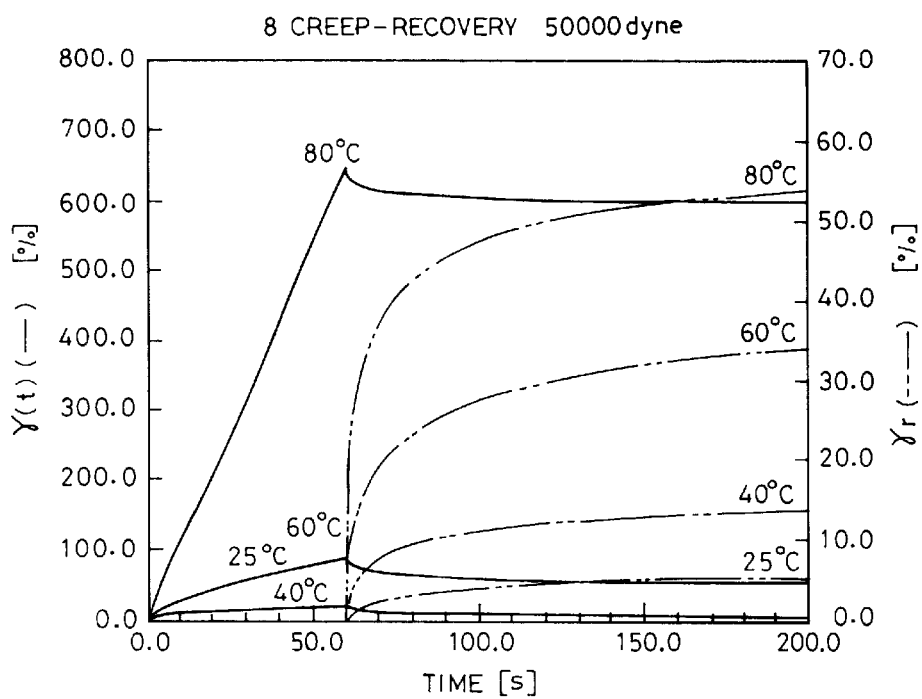
FIGS. 5 and 6 are graphs of creep recovery characteristics in embodiments according to the invention.
Figure 6:
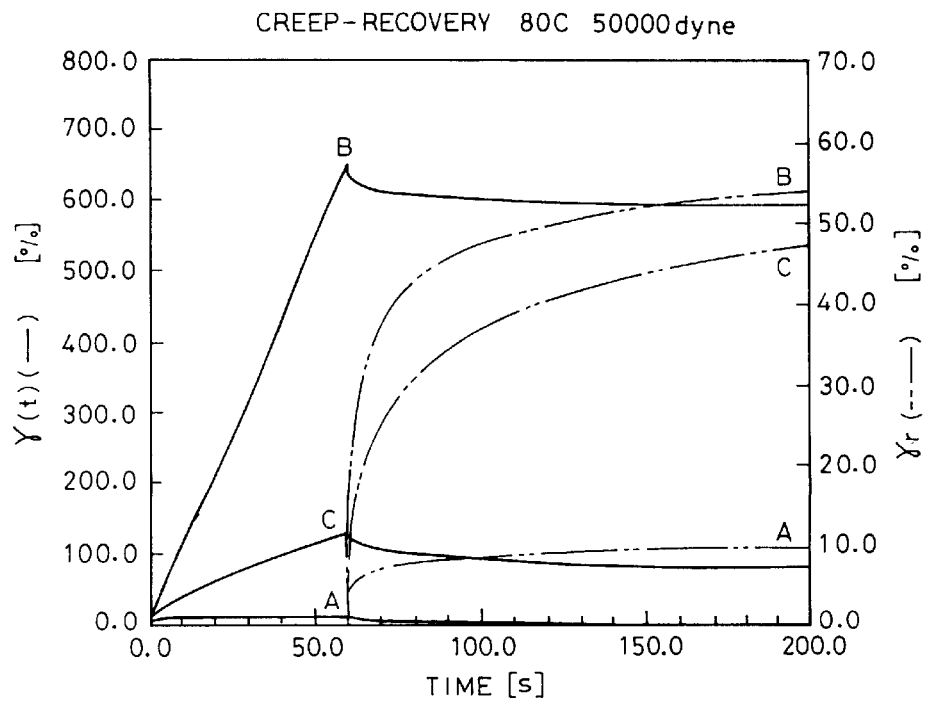

FIG. 5 shows curves of the creep recovery characteristic of the dry-light-curing-film B at 25 centigrade degree, 40 centigrade degree, 60 centigrade degree, and 80 centigrade degree respectively. FIG. 6 shows curves of creep recovery characteristics of the three kinds of the dry-light-curing-films A, B and C at 80 centigrade degree. The saturated strains and back strains are read from FIGS. 5 and 6, so that the creep recovery characteristics are calculated as the back strain/the saturated strain. Such evaluations of the results are shown in the following Table 1.

TABLE 1

| | Temperature | Characteristics Film A | Film B*** | Film C**** |
|---|---|---|---|---|
| Transfer-molding | 40° C. | bad | bad | bad |
| | 60° C. | bad | good | bad |
| | 80° C. | bad | good | good |
| Creep* | 25° C. | 10% | 22% | 17% |
| | 40° C. | — | 38% | — |
| | 60° C. | — | 46% | — |
| | 80° C. | 25% | 100% | 50% |
| Creep**-recovery | 25° C. | 100% | 74% | 97% |
| | 40° C. | — | 66.7% | — |
| | 60° C. | — | 38.2% | — |
| | 80° C. | 83.3% | 0.91% | 38.5% |

*Creep characteristics is defined as a ratio of change or strain in thickness with respect to undistorted thickness of the film.
**Creep recovery characteristic is defined as a ratio of change or strain after release of load in a creep test, i.e., saturated back strain/the creep characteristic.
***Film B is "SR-3000" available from Hitachi Chemical Industries, Ltd.,
****Film C is "HW-440" available from Hitachi Chemical Industries, Ltd., As seen from Table 1, the dry-light-curing-film C at 80 centigrade degree has a good transfer-molding characteristic and the dry-light-curing-films B at 60 centigrade degree and 80 centigrade degree have also good transfer-molding characteristics. These films thus exhibit the saturated strains of regularity creep of 45% or more at 60 centigrade degree. It can be therefore estimated to be required at least 40% or more at 80 centigrade degree for the good transfer-molding characteristic.

As further seen from Table 1, these films with good transfer-molding characteristics exhibit the back strain 38% or less with respect to the creep strain in the creep recovery characteristic. It can be therefore estimated to be required at least 40% or less at 80 centigrade degree for the good transfer-molding characteristic.

Next the above method of measuring the creep characteristics and the creep recovery characteristic are described below.

In the creep characteristics, the dry-light-curing-film is disposed between a pair of parallel circular plates each having a 15 mm diameter and, then, a constant pressure of 50,000 dyne/cm$^2$ is applied to the film via the circular plate in the thickness direction thereof. In this case, the thicknesses of the film are measured before and after the application of pressure. In other words, when the film with thickness x before the application of pressure is reduced by delta-x due to the pressure, the creep characteristics is defined by (delta-x/x)×100(%).

In the creep-recovery characteristic, the dry-light-curing-film is disposed between and adheres a pair of parallel circular plates each having a 8 mm diameter. One of the circular plates is twisted about the center axis of plates with a force of 5000 dyne at 80 centigrade degree with respect to the other. At this time, a strain or length developed in the periphery of the twisted circular plate from the untwisted position is measured as delta-x'. Next the twisting force is released and thus the a saturated back strain developed in the periphery of the twisted circular plate is measured as delta-x". Therefore, the creep-recovery characteristics is defined by (delta-x"/delta-x')×100(%).

In the optical element above mentioned, the lens pattern 7 is formed on the dry-light-curing-film 2 having a viscosity of 3,500 to 400,000 poises at room temperature in the unhardened state and a thickness of 30 to 100 micrometers in the unhardened state and as well as the specific ranging creep characteristics and creep recovery characteristic. Therefore, the deterioration of mechanical characteristics of the light-transmittable substrate 5 does not occur during the process for forming the lens pattern. Since the pressure required for the lens pattern formation to be applied to the film is enough for a small value, it does not necessitate a large device for generating a large pressure to be applied. Besides, no cooling device is required for the process for forming the lens pattern, since such a formation can be performed at a low temperature and a low pressure. In addition, there is not remained any bubbles in the dry-light-curing-film 2.

Accordingly, the optical element exhibits advantageous effects of neither deterioration of mechanical characteristics in the light-transmittable substrate 5 nor bubbles remaining in the dry-light-curing-film 2, so that the quality of the product thereof is stable and the productivity is improved.

The optical element of the invention with such a merits is manufactured through the following process at a high efficiency.

FIGS. 2A to 2D show the members in the method for making a Fresnel lens according to the invention respectively.

Figure 2A:
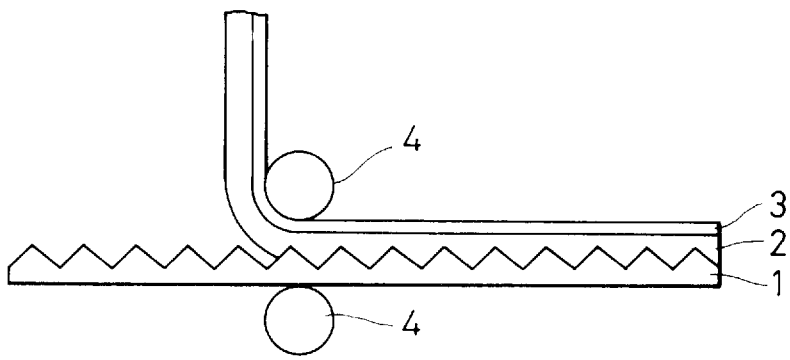
FIGS. 2A through 2D are sectional views showing members in the method for making a Fresnel lens according to the invention respectively.

FIG. 2A shows the lamination step in which a sheet carrying a dry-light-curing-film 2 on a protective film 3 is provided. A stamper 1 made of Ni is previously formed a shaping die having a Fresnel lens pattern. By using the roll laminator device, the dry-light-curing-film 2 is laminated onto the undulant pattern consisting of grooves or recesses of the stamper 1. This transfer-molding process is performed in such a manner that the laminate consisting of the protective film 3, the dry-light-curing-film 2 and the stamper 1 is heated at a temperature 60 centigrade degree or more and passed between a pair of rolls 4 under the predetermined application of pressure.

Here, for example, under the condition of the applied pressure of 5 kgf/cm$^2$, the temperature of 80 centigrade degree, the lamination speed of 3 m/minutes in the vacuum atmosphere, the Fresnel lens pattern was transfer-molded from the stamper 1 to the dry-light-curing-film 2.

Figure 2B:
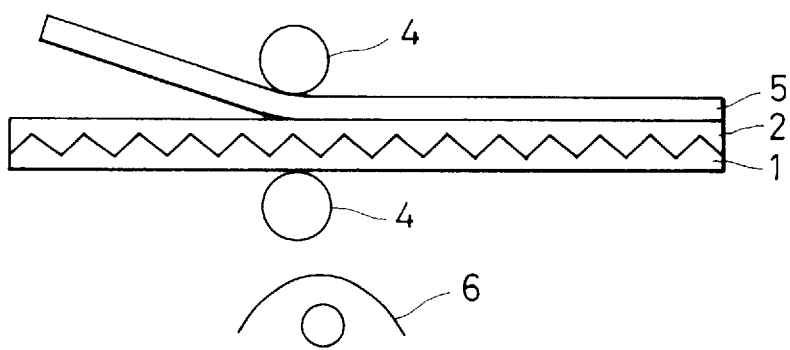

FIG. 2B shows the adhering step in which the protective film 3 is removed from the laminates and then a light-transmittable substrate 5 e.g., acrylic resins plate is disposed on the dry-light-curing-film 2. This adhering process is performed that the laminate of the light-transmittable substrate 5 and the dry-light-curing-film 2 with the stamper 1 is passed between a pair of rolls 4 under the predetermined application of pressure.

Figure 2C:
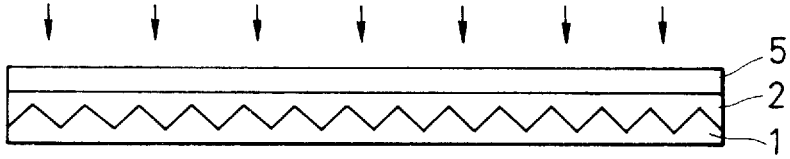

FIG. 2C shows the UV radiation curing step in which an UV radiation ramp 6 irradiates an UV radiation through the light-transmittable substrate 5 into the dry-light-curing-film 2. By curing of the dry-light-curing-film 2, it is affixed to the light-transmittable substrate 5.

Figure 2D:
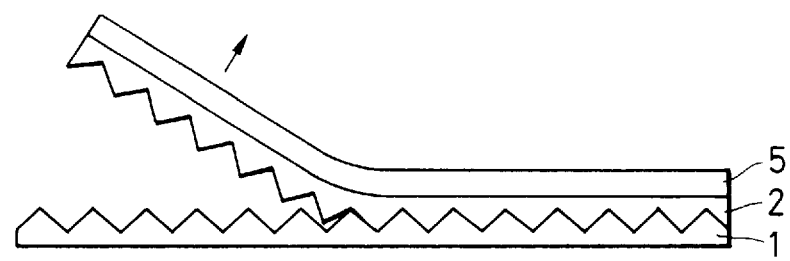

FIG. 2D shows the peeling step in which the dry-light-curing-film 2 and the light-transmittable substrate 5 adhering to each other is pealed from the stamper 1. As a result, the Fresnel lens is obtained.

The dry-light-curing-film 2 used in this process has a viscosity of 3,500 to 400,000 poises, preferably 20,000 to 40,000 poises at room temperature in the unhardened state and has a thickness of 30 to 100 micrometers, preferably 50 to 75 micrometers in the unhardened state and as well as a creep characteristics of 40% or more at 80 centigrade degree and a creep recovery characteristic of 40% or less. Such a dry-light-curing-film having the specific viscosity, creep characteristics and the creep recovery characteristic is available from Hitachi Chemical Industries, Ltd., as "SR-3000" and "HW-440".

The resultant produced optical element has a stable quality of the product thereof in neither deterioration of mechanical characteristics in the light-transmittable substrate 5 nor bubbles remaining in the dry-light-curing-film 2.

Since the method according to the invention utilizes the dry-light-curing-film 2 having a viscosity of 3,500 to 400,000 poises at room temperature in the unhardened state, the lens pattern 7 can be formed on the dry-light-curing-film 2 at room temperature, so that the required pressure for the lens pattern formation is reduced and it does not necessitate a large device for generating a large pressure to be applied. In addition, since any possible bubbles in the dry-light-curing-film 2 under the unhardened state is readily expelled in the transfer-molding step, no bubble remains in the dry-light-curing-film 2. Moreover, the lens pattern 7 is formed on the dry-light-curing-film 2 having a thickness of 30 to 100 micrometers in the unhardened state and the specific ranging creep characteristics and creep recovery characteristic, an improved transfer-molding characteristic is achieved at a high accuracy of lens pattern, so that there is not remained any internal stress of the dry-light-curing-film 2 caused by the contraction of curing of film. Therefore, according to the invention, the light-transmittable substrate has no deterioration of mechanical characteristics and the dry-light-curing-film has no bubble remained, so that a stable product quality of the optical element can be achieved by a simple equipment at a high productivity.

In addition to the Fresnel lens pattern formation in the use of the dry-light-curing-film having the specific viscosity, thickness, creep characteristics and the creep recovery characteristic, the invention may be applied to the formation of optical filters such as a black matrix. In this case, grid grooves are transfer-molded on the dry-light-curing-film and then a black material is buried into the grid grooves.

The optical element according to the invention comprises the laminates of the light-transmittable substrate and the dry-light-curing-film, which has a viscosity of the specific range at room temperature in the unhardened state, a thickness of the specific range in the unhardened state, and the creep characteristics and the creep recovery characteristic in the specific ranges, characterized by the dry-light-curing-film carries the undulant pattern for the optical element. Therefore, the present invention can provide the optical element without deterioration of mechanical characteristics nor bubble remained in the dry-light-curing-film, so that a stable product quality of the optical element can be achieved by a simple equipment at a high productivity.

According to the present invention, the method of making an optical element comprising a dry-light-curing-film with predetermined characteristics of viscosity, thickness and the creep characteristic and the creep recovery characteristic; characterized in that a light-transmittable substrate affixed to the dry-light-curing-film while pressing the substrate by a roller under an increased pressure condition to form a laminate; and in that an UV radiation is irradiated into the dry-light-curing-film to harden the dry-light-curing-film. Such invention provides the method capable of transfer-molding an undulant pattern of a lens-molding with an improved transfer-molding characteristic at a high accuracy of lens pattern, in which, the light-transmittable substrate has no deterioration of mechanical characteristics and the dry-light-curing-film has no bubble remained, so that a stable product quality of the optical element can be achieved by a simple equipment at a high productivity.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. An optical element comprising;
   a light-transmittable substrate;
   a light-transmittable dry-light-curing-film layered on the light-transmittable substrate and having an undulant pattern on a surface thereof; and
   said dry-light-curing-film characterized by the following;
      (a) a viscosity ranging from 3,500 to 400,000 poises at room temperature in the unhardened state, (b) a thickness ranging from 30 to 100 micrometers in the unhardened state,
      (c) a creep characteristic and a creep recovery characteristic being satisfied with the following inequalities (1) and (2) respectively, $$0.4 =< \text{delta}-x/x \tag{1}$$

$$0.4 => \text{delta}-x''/\text{delta}-x' \tag{2}$$

wherein x denotes a thickness of the dry-light-curing-film,
   delta–x denotes a saturated strain developed in the thickness direction of the dry-light-curing-film disposed between a pair of circular plates to which a pressure of 50,000 dyne/cm$^2$ at 80 centigrade degree,
   delta–x' denotes a strain developed in the periphery of one of a pair of circular plates between which the dry-light-curing-film is disposed and adhering them when the one of circular plates is twisted with a force of 5000 dyne at 80 centigrade degree with respect to the other, and
   delta–x" denotes a saturated back strain developed in the periphery of the one of circular plates after release of the force of 5000 dyne.

2. A method of making an optical element comprising the steps of:
   providing a molding die having an undulant pattern on a surface thereof;
   providing a dry-light-curing-film characterized by the following;
      (a) a viscosity ranging from 3,500 to 400,000 poises at room temperature in the unhardened state,
      (b) a thickness ranging from 30 to 100 micrometers in the unhardened state,
      (c) a creep characteristic and a creep recovery characteristic being satisfied with the following inequalities (1) and (2) respectively, $$0.4 =< \text{delta}-x/x \tag{1}$$

$$0.4 => \text{delta}-x''/\text{delta}-x' \tag{2}$$

wherein x denotes a thickness of the dry-light-curing-film,
   delta–x denotes a saturated strain developed in the thickness direction of the dry-light-curing-film disposed between a pair of circular plates to which a pressure of 50,000 dyne/cm² at 80 centigrade degree, delta–x' denotes a strain developed in the periphery of one of a pair of circular plates between which the dry-light-curing-film is disposed and adhering them when the one of circular plates is twisted with a force of 5000 dyne at 80 centigrade degree with respect to the other, and delta–x" denotes a saturated back strain developed in the periphery of the one of circular plates after release of the force of 5000 dyne;

pressing the dry-light-curing-film onto the surface of the molding die by a roller under heated and reduced pressure conditions to form undulant pattern on the dry-light-curing-film;

affixing a light-transmittable substrate to the dry-light-curing-film while pressing the substrate by a roller under an increased pressure condition to form a laminate;

irradiating an UV radiation into the dry-light-curing-film to harden the dry-light-curing-film; and separating the molding die from the dry-light-curing-film to form an optical element.

* * * * *